United States Patent
Abe et al.

(10) Patent No.: US 8,865,353 B2
(45) Date of Patent: Oct. 21, 2014

(54) NONAQUEOUS ELECTROLYTE AND LITHIUM CELL USING THE SAME

(75) Inventors: Koji Abe, Ube (JP); Masahide Kondo, Ube (JP)

(73) Assignee: Ube Industries, Ltd., Ube-shi (JP)

( * ) Notice: Subject to any disclaimer, the term of this patent is extended or adjusted under 35 U.S.C. 154(b) by 931 days.

(21) Appl. No.: 13/057,035

(22) PCT Filed: Aug. 4, 2009

(86) PCT No.: PCT/JP2009/063782
§ 371 (c)(1),
(2), (4) Date: Apr. 21, 2011

(87) PCT Pub. No.: WO2010/016475
PCT Pub. Date: Feb. 11, 2010

(65) Prior Publication Data
US 2012/0021300 A1    Jan. 26, 2012

(30) Foreign Application Priority Data

Aug. 4, 2008 (JP) .................................. 2008-200636

(51) Int. Cl.

| | |
|---|---|
| *H01M 6/18* | (2006.01) |
| *H01M 6/16* | (2006.01) |
| *H01M 10/0569* | (2010.01) |
| *H01M 10/0567* | (2010.01) |
| *H01M 10/0568* | (2010.01) |
| *H01M 10/052* | (2010.01) |

(52) U.S. Cl.
CPC .......... *H01M 10/0567* (2013.01); *H01M 6/168* (2013.01); *H01M 10/0569* (2013.01); *H01M 10/0568* (2013.01); *H01M 6/166* (2013.01); H01M 2300/0042 (2013.01); *H01M 10/052* (2013.01); Y02T 10/7011 (2013.01); Y02E 60/12 (2013.01)
USPC ........... 429/307; 429/330; 429/332; 429/331; 429/199; 429/200; 429/328; 429/336; 429/339; 252/62.2

(58) Field of Classification Search
USPC ......... 429/307, 330, 332, 331, 199, 200, 328, 429/336, 339; 252/62.2
See application file for complete search history.

(56) References Cited

FOREIGN PATENT DOCUMENTS

| | | |
|---|---|---|
| JP | 11-273728 | 10/1999 |
| JP | 2003-7333 | 1/2003 |
| JP | 2003-151622 | 5/2003 |
| JP | 2003-208920 | 7/2003 |

OTHER PUBLICATIONS

International Search Report issued Nov. 17, 2009, in Patent Application No. PCT/JP2009/063782.

*Primary Examiner* — Laura Weiner
(74) *Attorney, Agent, or Firm* — Oblon, Spivak, McClelland, Maier & Neustadt, L.L.P.

(57) ABSTRACT

A nonaqueous electrolytic solution of an electrolyte salt dissolved in a nonaqueous solvent, containing a hydantoin compound represented by the following general formula (I) in an amount of from 0.01 to 5% by mass of the nonaqueous electrolytic solution, and excellent in battery characteristics such as high-temperature storage property and cycle property.

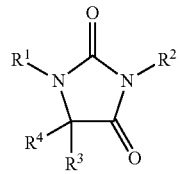

(I)

(In the formula, $R^1$ and $R^2$ each represent a methyl group or an ethyl group; $R^3$ and $R^4$ each represent a hydrogen atom, a methyl group or an ethyl group.)

13 Claims, No Drawings

NONAQUEOUS ELECTROLYTE AND LITHIUM CELL USING THE SAME

TECHNICAL FIELD

The present invention relates to a nonaqueous electrolytic solution excellent in battery characteristics such as high-temperature storage property and cycle property, and to a lithium battery using it.

BACKGROUND ART

In recent years, lithium secondary batteries have been widely used as driving power supplies for small-size electronic devices such as mobile telephones, notebook-size personal computers and the like, and for power supplies for electric vehicles and for electric power storage.

A lithium secondary battery is mainly constituted of a positive electrode and a negative electrode containing a material capable of absorbing and releasing lithium, and a nonaqueous electrolytic solution containing a lithium salt. For the nonaqueous electrolytic solution, used are carbonates such as ethylene carbonate (EC), propylene carbonate (PC), etc.

As the negative electrode for the lithium secondary battery, known are metal lithium, and metal compounds (metal elemental substances, oxides, alloys with lithium, etc.) and carbon materials capable of absorbing and releasing lithium. In particular, nonaqueous electrolytic solution-containing lithium secondary batteries using a carbon material capable of absorbing and releasing lithium such as coke, graphite (artificial graphite, natural graphite) or the like have been widely put into practical use.

The above-mentioned negative electrode materials store and release lithium and electron at a low potential on the same level as that of lithium metal, and therefore especially at high temperatures, they have a possibility of reduction and decomposition of many solvents, and irrespective of the type of the negative electrode material, the solvent in the electrolytic solution may be partly reductively decomposed on a negative electrode, therefore bringing about some problems in that the resistance may increase owing to deposition of decomposed products, that the battery may be swollen owing to gas generation through solvent decomposition and that lithium ion movement may be retarded thereby worsening the battery characteristics such as cycle property and the like.

On the other hand, a material capable of storing and releasing lithium such as $LiCoO_2$, $LiMn_2O_4$, $LiNiO_2$, $LiFePO_4$ or the like that is used as a positive electrode material stores and releases lithium and electron at a high voltage of 3.5 V or more based on lithium, and therefore has a possibility of oxidation and decomposition of many solvents. In addition, irrespective of the type of the positive electrode material, the solvent in the electrolytic solution may be partly oxidized and decomposed on a positive electrode, therefore bringing about some problems in that the resistance may increase owing to deposition of decomposed products on the surface of the positive electrode, that the battery may be swollen owing to gas generation through solvent decomposition and that lithium ion movement may be retarded thereby worsening the battery characteristics such as cycle property and the like.

As a lithium primary battery, for example, there is known a lithium primary battery comprising manganese dioxide or graphite fluoride as the positive electrode and a lithium metal as the negative electrode, and this is widely used as having a high energy density. It is desired to inhibit the increase in the internal resistance of the battery during long-term storage and to improve the long-term storage property thereof at high temperatures.

Recently, further, as a novel power source for electric vehicles or hybrid electric vehicles, electric storage devices have been developed, for example, an electric double layer capacitor using activated carbon or the like as the electrode from the viewpoint of the output power density thereof, and a so-called hybrid capacitor comprising a combination of the electric power storage principle of a lithium ion secondary battery and that of an electric double layer capacitor (an asymmetric capacitor where both the capacity by lithium absorption and release and the electric double layer capacity are utilized) from the viewpoint of both the energy density and the output power density thereof; and it is desired to improve the battery performance of the capacitors such as the cycle property at high temperatures and the high-temperature storage property thereof.

Patent Reference 1 discloses a lithium secondary battery using a nonaqueous electrolytic solution that contains a nonaqueous solvent containing a lactone compound and a nitrogen-having heterocyclic compound such as 1-methyl-2-pyrrolidone, saying that the charge-discharge efficiency and the capacity retention after high-temperature charging and storage of the lactone compound-containing nonaqueous electrolytic solution is improved. Patent Reference 1 shows extremely a large number of nitrogen-having heterocyclic compounds; and in its paragraph [0017], 1,3-dimethylimidazolidine-2,5-dione and 1,3-diethylimidazolidine-2,5-dione are shown. However, addition of such a hydantoin compound is not concretely described at all in Patent Reference 1. No substantial investigation about it is made therein.

Patent Reference 2 discloses a nonaqueous electrolytic solution comprising a succinimide derivative added to a nonaqueous solvent containing an asymmetric carbonate, saying that the cycle property at 20° C. and the capacity retention after high-temperature charging and storage of the lithium secondary battery shown therein are good.

Patent Reference 3 discloses a nonaqueous electrolytic solution battery in which the nonaqueous electrolyte contains 1,3-dimethyl-2-imidazolidinone, saying that the load characteristic, the cycle property at 23° C. and the capacity retention after high-temperature charging and storage of the battery have been improved.

[Patent Reference 1] JP-A 2003-7333
[Patent Reference 2] JP-A 2003-151622
[Patent Reference 3] JP-A 11-273728

DISCLOSURE OF THE INVENTION

Problems that the Invention is to Solve

An object of the present invention is to provide a nonaqueous electrolytic solution comprising a hydantoin compound and excellent in battery characteristics such as high-temperature storage property and cycle property, and to provide a lithium battery using it.

Means for Solving the Problems

The present inventors have assiduously studied the properties of the conventional nonaqueous electrolytic solutions mentioned above. As a result, the inventors have found that the nonaqueous electrolytic solution containing, as added thereto, the compound disclosed in Examples of Patent References 1 to 3 is not satisfactory in point of the cycle property thereof at high temperatures and of the discharge voltage reduction owing to the increase in the internal resistance of the battery after storage at high temperatures in a charged state.

Given that situation, the present inventors have further assiduously studied for solving the above-mentioned problems and, as a result, have found that addition of a cyclic compound, hydantoin compound having a structure of (—CO—NR²—CO—NR¹—) with two continuous units of (—CO—NR—) (amide structure) to a nonaqueous electrolytic solution of an electrolyte salt dissolved in a nonaqueous solvent improves battery characteristics such as high-temperature storage property and cycle property, and have completed the present invention.

Specifically, the present invention provides the following (1) and (2):

(1) A nonaqueous electrolytic solution of an electrolyte salt dissolved in a nonaqueous solvent, containing a hydantoin compound represented by the following general formula (I), as dissolved therein in an amount of from 0.01 to 5% by mass:

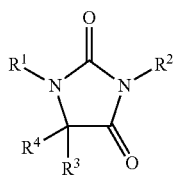

(In the formula, $R^1$ and $R^2$ each represent a methyl group or an ethyl group; $R^3$ and $R^4$ each represent a hydrogen atom, a methyl group or an ethyl group.)

(2) A lithium battery comprising a positive electrode, a negative electrode, and a nonaqueous electrolytic solution of an electrolyte salt dissolved in a nonaqueous solvent, wherein the nonaqueous electrolytic solution contains the hydantoin compound represented by the above-mentioned general formula (I) in an amount of from 0.01 to 5% by mass.

Advantage of the Invention

According to the present invention, there is provided a lithium battery excellent in battery characteristics such as high-temperature storage property and cycle property by adding a hydantoin compound having a specific structure to the nonaqueous electrolytic solution for the battery.

BEST MODE FOR CARRYING OUT THE INVENTION

[Nonaqueous Electrolytic Solution]

The nonaqueous electrolytic solution of the present invention is a nonaqueous electrolytic solution of an electrolyte salt dissolved in a nonaqueous solvent, which contains a hydantoin compound represented by the general formula (I) mentioned below in an amount of from 0.01 to 5% by mass.

[Hydantoin Compound]

The hydantoin compound to be in the nonaqueous electrolytic solution of the present invention is represented by the following general formula (I):

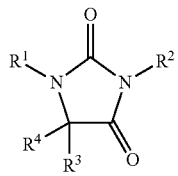

(In the formula, $R^1$ and $R^2$ each represent a methyl group or an ethyl group; $R^3$ and $R^4$ each represent a hydrogen atom, a methyl group or an ethyl group.)

In the general formula (I), preferably, $R^1$ and $R^2$ are methyl groups as further improving the battery characteristics such as the high-temperature storage property and the cycle property. In the general formula (I), preferably, at least one of $R^3$ and $R^4$ is a methyl group or an ethyl group as further improving the battery characteristics such as the high-temperature storage property and the cycle property; and more preferably, both the two are methyl groups.

Specific examples of the hydantoin compound represented by the above-mentioned general formula (I) include 1,3-dimethyl-hydantoin, 1,3-diethyl-hydantoin, 3-ethyl-1-methyl-hydantoin, 1-ethyl-3-methyl-hydantoin, 1,3,5-trimethyl-hydantoin, 1,3,5,5-tetramethyl-hydantoin, 1-ethyl-3,5,5-trimethyl-hydantoin, 3-ethyl-1,5,5-trimethyl-hydantoin, etc. Of those, preferred are 1,3-dimethyl-hydantoin, 3-ethyl-1-methyl-hydantoin, 1,3,5,5-tetramethyl-hydantoin, 3-ethyl-1, 5,5-trimethyl-hydantoin, etc.; and more preferred are 1,3-dimethyl-hydantoin, 1,3,5,5-tetramethyl-hydantoin; and even more preferred is 1,3,5,5-tetramethyl-hydantoin.

In the nonaqueous electrolytic solution of the present invention, when the content of at least one hydantoin compound represented by the above-mentioned general formula (I) is more than 5% by mass, then an excessive surface film may be formed on the electrode to thereby often worsen the battery characteristics such as the high-temperature storage property and the cycle property; but when the content is less than 0.01% by mass, then the formation of the surface film may be insufficient and the battery could not enjoy the effect of improving the battery characteristics such as the high-temperature storage property and the cycle property thereof. Accordingly, the content of the compound is at least 0.01% by mass in the nonaqueous electrolytic solution, preferably at least 0.5% by mass, more preferably at least 1% by mass. Its uppermost limit is at most 5% by mass, preferably at most 4% by mass, more preferably at most 3% by mass, even more preferably at most 2% by mass.

The nonaqueous electrolytic solution of the present invention with the hydantoin compound represented by the above-mentioned formula (I) added thereto can improve battery characteristics such as high-temperature storage property and cycle property of batteries. Though not always clear, the reason may be considered as follows: Specifically, when a hydantoin compound represented by the above-mentioned general formula (I) is added to an electrolytic solution, then a protective surface film could be formed through ring-opening polymerization of the hydantoin compound on both the positive electrode and the negative electrode in charging. The hydantoin compound of the present invention has continuous two units of (—CO—NR—) (amide structure) and therefore could form a surface film that contains (—CO—NR—) units to be the trap sites for Li ions therein, in a high concentration. Accordingly, the hydantoin compound of the present invention could efficiently prevent the decomposition of the solvent in the electrolytic solution, and therefore could improve the battery characteristics such as the high-temperature storage property and the cycle properties of batteries.

It has been known that the above-mentioned effect is a specific effect quite different from the effect in the other cases where a compound having a structure similar to the structure (—CO—NR$^2$—CO—NR$^1$—), an amide structure such as 1-methyl-2-pyrrolidone (—CO—N(CH$_3$)—) or the like, an imide structure such as N-methylsuccinimide (—CO—N(CH$_3$)—CO—) or the like, an urea structure such as 1,3-dimethyl-2-imidazolidinone (—N(CH$_3$)—CO—N(CH$_3$)—) or the like is added.

The hydantoin compound represented by the above-mentioned general formula (I) to be in the nonaqueous electrolytic solution of the present invention may be used singly as it is for improving battery characteristics such as high-temperature storage property and cycle property; however, when used as combined with a nonaqueous solvent, an electrolyte salt and further other additives mentioned below, the compound can exhibit a specific effect of synergistically improving battery characteristics such as high-temperature storage property and cycle property. Though not always clear, it could be considered that there would be formed a mixed surface film of high ionic conductivity containing the hydantoin compound and the constitutive elements of the nonaqueous solvent, the electrolyte salt and further other additives added thereto.

[Nonaqueous Solvent]

The nonaqueous solvent to be used in the nonaqueous electrolytic solution of the present invention preferably contains at least a cyclic carbonate and a linear carbonate. As other nonaqueous solvents, there are mentioned linear esters, ethers, amides, phosphates, sulfones, nitriles, S=O bond-having compounds, cyclic peroxides etc.

The cyclic carbonates include ethylene carbonate (EC), propylene carbonate (PC), butylene carbonate (BC), 4-fluoro-1,3-dioxolan-2-one (FEC), trans or cis-4,5-difluoro-1,3-dioxolan-2-one (hereinafter the two are referred to as a generic term "DFEC"), vinylene carbonate (VC), vinylethylene carbonate (VEC), etc. Of those, preferred for use herein are cyclic carbonates containing at least one selected from EC, PC, and double bond or fluorine-having cyclic carbonates; more preferred is use of EC and/or PC and at least one of double bond or fluorine-having cyclic carbonate as markedly improving battery characteristics such as high-temperature storage property and cycle property; and even more preferred is use of EC and/or PC, and both a double bond-having cyclic carbonate and a fluorine-having cyclic carbonate. As the double bond-having cyclic carbonate, preferred are VC and VEC; and as the fluorine-having cyclic carbonate, preferred are FEC and DFEC.

One type of the solvent may be used; however, use of two or more different types of those solvents is preferred as further enhancing the effect of improving battery characteristics such as high-temperature storage property and cycle property. More preferably, three or more types of the solvents are used as combined. Preferred combinations of these cyclic carbonates include EC and PC, EC and VC, EC and VEC, PC and VC, FEC and VC, FEC and EC, FEC and PC, FEC and DFEC, DFEC and EC, DFEC and PC, DFEC and VC, DFEC and VEC, EC and PC and VC, EC and PC and FEC, EC and FEC and VC, EC and VC and VEC, FEC and PC and VC, DFEC and EC and VC, DFEC and PC and VC, FEC and EC and PC and VC, DFEC and EC and PC and VC, etc. Of the combinations, more preferred are combinations of EC and VC, FEC and PC, DFEC and PC, EC and FEC and PC, EC and FEC and VC, EC and VC and VEC, etc.

Not specifically defined, the content of the cyclic carbonate is preferably at the range from 10 to 40% by volume, based on the overall volume of the nonaqueous solvent. When the content is less than 10% by volume, then the electroconductivity of the electrolytic solution lowers and the cycle property may worsen; but when the content is more than 40% by volume, then the battery characteristics such as high-temperature storage property and cycle property may worsen.

The linear carbonates include asymmetric linear carbonates such as methyl ethyl carbonate (MEC), methyl propyl carbonate, methyl isopropyl carbonate, methyl butyl carbonate, ethyl propyl carbonate, etc.; and symmetric linear carbonates such as dimethyl carbonate (DMC), diethyl carbonate (DEC) dipropyl carbonate, dibutyl carbonate, etc. Especially preferably, the electrolytic solution contains an asymmetric carbonate, as capable of improving the battery characteristics such as high-temperature storage property and cycle property. Also preferably, the proportion of the asymmetric linear carbonate in the linear carbonate is at least 50% by volume. As the asymmetric linear carbonate, preferred are those having a methyl group, and most preferred is MEC.

One type of these linear carbonates may be used singly; however, use of two or more types thereof as combined is favorable as more effective for improving the battery characteristics such as high-temperature storage property and cycle property.

Not specifically defined, the content of the linear carbonate is preferably at the range from 60 to 90% by volume, based on the overall volume of the nonaqueous solvent. When the content is less than 60% by volume, then the viscosity of the electrolytic solution may increase; but when more than 90% by volume, then the electroconductivity of the electrolytic solution may lower and the battery characteristics such as high-temperature storage property and cycle property may worsen. Accordingly, the content is preferably within the above-mentioned range.

The ratio of the cyclic carbonate to the linear carbonate, cyclic carbonate/linear carbonate (by volume) is preferably from 10/90 to 40/60, more preferably from 15/85 to 35/65, even more preferably from 20/80 to 30/70, from the viewpoint of improving the battery characteristics such as high-temperature storage property and cycle property.

The linear esters include methyl propionate, ethyl propionate, methyl acetate, ethyl acetate, methyl pivalate, butyl pivalate, hexyl pivalate, octyl pivalate, dimethyl oxalate, ethylmethyl oxalate, diethyl oxalate, etc.; the ethers include cyclic ethers such as tetrahydrofuran, 2-methyltetrahydrofuran, 1,3-dioxolane, 1,3-dioxane, 1,4-dioxane, etc.; and linear ethers such as 1,2-dimethoxyethane, 1,2-diethoxyethane, 1,2-dibutoxyethane, etc.

The amides include dimethylamide, etc.; the phosphates include trimethyl phosphate, tributyl phosphate, trioctyl phosphate, etc.; the sulfones include sulforane, etc.; the nitriles include mononitrile compounds such as acetonitrile, propionitrile, etc.; and dinitrile compounds such as succinonitrile, glutaronitrile, adiponitrile, etc.

The S=O bond-having compounds include 1,3-propanesultone, ethylene sulfite, hexahydrobenzo[1,3,2]dioxathiolan-2-oxide (this may be called 1,2-cyclohexanediol cyclic sulfite), 5-vinyl-hexahydro-1,3,2-benzodioxathiol-2-oxide, 1,4-butanediol dimethanesulfonate, divinylsulfone, 1,2-bis(vinylsulfonyl)ethane, bis(2-vinylsulfonylethyl)ether, etc.

The cyclic peroxides include 7,8.15.16-tetraoxadispiro[5.2.5.2]hexadecane, 14,15-dioxa-7-azadispiro[5.1.5.2]pentadecane, etc.

Use of the above-mentioned nonaqueous solvent of ethers, nitriles, S=O bond-having compounds and cyclic peroxides, as combined with the hydantoin compound represented by the general formula (I) is especially favorable as improving the battery characteristics such as high-temperature storage property and cycle property. Especially preferred are cyclic peroxides such as 7,8,15,16-tetraoxadispiro[5.2.5.2]hexadecane, 14,15-dioxa-7-azadispiro[5.1.5.2]pentadecane or the like, or dinitrile compounds. When the amount to be added of the compound to be combined with the hydantoin compound represented by the general formula (I) is more than 5% by mass, then the cycle property may worsen and the compound could not exhibit the effect of improving the high-temperature storage property in a charged state; but when less than 0.1% by mass, then the compound could not sufficiently exhibit the effect of improving the battery characteristics such as high-temperature storage property and cycle property. Accordingly, the content is preferably at least 0.1% by mass of the nonaqueous electrolytic solution, more preferably at least 0.5% by mass; and its uppermost limit is preferably at most 5% by mass, more preferably at most 3% by mass.

The above-mentioned nonaqueous solvents are mixed for use herein, for the purpose of attaining the suitable properties of the solution. The combinations include, for example, a combination of cyclic carbonates and linear carbonates, a combination of cyclic carbonates and linear carbonates and linear esters, a combination of cyclic carbonates and linear carbonates and ethers, a combination of cyclic carbonates and linear carbonates and nitriles, a combination of cyclic carbonates and linear carbonates and S=O bond-having compounds, etc.

Of those, preferred is a nonaqueous solvent of a combination of at least cyclic carbonates and linear carbonates, as capable of improving the battery characteristics such as high-temperature storage property and cycle property. More concretely, preferred is a combination of at least one cyclic carbonate selected from EC, PC, VC and FEC, and at least one linear carbonate selected from DMC, MEC and DEC.

When a lactone compound such as γ-butyrolactone (GBL), γ-valerolactone or the like is used as the solvent, the solvent could not always exhibit the effect of the present invention of improving the battery characteristics such as high-temperature storage property and cycle property. The reason would be because, when a lactone compound such as γ-butyrolactone or the like is used as the solvent, the lactone compound may decompose at a high temperature and, before the hydantoin compound of the present invention forms a surface film, the decomposed product of the lactone compound may form a surface film having a high resistance to retard Li ion movement. Accordingly, it is desirable that the nonaqueous solvent does not contain a lactone compound.

[Electrolyte Salt]

The electrolyte for use in the present invention includes Li salts such as $LiPF_6$, $LiBF_4$, $LiClO_4$, etc.; linear fluoroalkyl group-having lithium salts such as $LiN(SO_2CF_3)_2$, $LiN(SO_2C_2F_5)_2$, $LiCF_3SO_3$, $LiC(SO_2CF_3)_3$, $LiPF_4(CF_3)_2$, $LiPF_3(C_2F_5)_3$, $LiPF_3(CF_3)_3$, $LiPF_3(iso-C_3F_7)_3$, $LiPF_5(iso-C_3F_7)$, etc.; cyclic fluoroalkylene chain-having lithium salts such as $(CF_2)_2(SO_2)_2NLi$, $(CF_2)_3(SO_2)_2NLi$ etc.; and lithium salts with an anion of an oxalate complex such as lithium bis[oxalate-O,O']borate, lithium difluoro[oxalate-O,O']borate, etc. Of those, especially preferred electrolyte salts are $LiPF_6$, $LiBF_4$, $LiN(SO_2CF_3)_2$, $LiN(SO_2C_2F_5)_2$; and most preferred electrolyte salts are $LiPF_6$, $LiBF_4$ and $LiN(SO_2CF_3)_2$. One or more of these electrolyte salts may be used herein either singly or as combined.

A preferred combination of these electrolyte salts is a combination containing $LiPF_6$ as combined with at least one selected from $LiBF_4$, $LiN(SO_2CF_3)_2$ and $LiN(SO_2C_2F_5)_2$. Preferred are a combination of $LiPF_6$ and $LiBF_4$; a combination of $LiPF_6$ and $LiN(SO_2CF_3)_2$; a combination of $LiPF_6$ and $LiN(SO_2C_2F_5)_2$, etc. When the ratio (by mol) of $LiPF_6$/[electrolyte selected from $LiBF_4$, $LiN(SO_2CF_3)_2$ and $LiN(SO_2C_2F_5)_2$] is smaller than 70/30 in point of the proportion of $LiPF_6$, or when the ratio is larger than 99/1 in point of the proportion of $LiPF_6$, then the battery characteristics such as high-temperature storage property and cycle property may worsen. Accordingly, the ratio (by mol) of $LiPF_6$/[electrolyte selected from $LiBF_4$, $LiN(SO_2CF_3)_2$ and $LiN(SO_2C_2F_5)_2$] is preferably at the range from 70/30 to 99/1, more preferably from 80/20 to 98/2. The combination falling within the above range is more effective for further enhancing the effect of improving the battery characteristics such as high-temperature storage property and cycle property.

The electrolyte salts may be mixed in any desired ratio. In the combination of $LiPF_6$ with any of $LiBF_4$, $LiN(SO_2CF_3)_2$ and $LiN(SO_2C_2F_5)_2$, when the proportion (as ratio by mol) of the other electrolyte salt than those ingredients to the total electrolyte salts is less than 0.01%, then the effect of improving the battery characteristics such as high-temperature storage property and cycle property would be poor; but when it is more than 45%, then the battery characteristics such as high-temperature storage property and cycle property may worsen. Accordingly, the proportion (as ratio by mol) is preferably from 0.01 to 45%, more preferably from 0.03 to 20%, even more preferably from 0.05 to 10%, most preferably from 0.05 to 5%.

The concentration of all these electrolyte salts as dissolved in the solution is generally preferably at least 0.3 M relative to the above-mentioned nonaqueous solvent, more preferably at least 0.5 M, most preferably at least 0.7 M. The uppermost limit of the concentration is preferably at most 2.5 M, more preferably at most 2.0 M, even more preferably at most 1.5 M, most preferably at most 1.2 M.

As the electrolyte for electric double layer capacitors, usable are known quaternary ammonium salts such as tetraethylammonium tetrafluoroborate, triethylmethylammonium tetrafluoroborate, tetraethylammonium hexafluorophosphate, etc.

[Other Additives]

In addition to the compound of the general formula (I), an aromatic compound may be added to the nonaqueous electrolytic solution of the present invention in an amount of from 0.1 to 5% by mass, thereby securing the safety of the battery in an overcharged state. The aromatic compound includes cyclohexylbenzene, fluorocyclohexylbenzene compound (1-fluoro-2-cyclohexylbenzene, 1-fluoro-3-cyclohexylbenzene, 1-fluoro-4-cyclohexylbenzene), tert-butylbenzene, tert-amylbenzene, 1-fluoro-4-tert-butylbenzene, 1,3-di-tert-butylbenzene, biphenyl, terphenyl (o-, m-, p-form), diphenyl ether, fluorobenzene, difluorobenzene (o-, m-, p-form), 2,4-difluoroanisole, terphenyl partial hydrolyzate (1,2-dicyclohexylbenzene, 2-phenylbicyclohexyl, 1,2-diphenylcyclohexane, o-cyclohexylbiphenyl), etc. One or more of these aromatic compounds may be used herein either singly or as combined.

Above all, preferred is adding cyclohexyl benzene, fluorocyclohexylbenzene compound (1-fluoro-2-cyclohexylbenzene, 1-fluoro-3-cyclohexylbenzene, 1-fluoro-4-cyclohexylbenzene), or branched alkylbenzene compound selected from tert-butylbenzene, tert-amylbenzene, 1-fluoro-4-tert-butylbenzene and 1,3-di-tert-butylbenzene, as improving the battery characteristics such as high-temperature storage property and cycle property; and more preferred are tert-butyl benzene, tert-amylbenzene, 1-fluoro-4-tert-butylbenzene, 1,3-di-tert-butylbenzene.

[Production of Nonaqueous Electrolytic Solution]

The nonaqueous electrolytic solution of the present invention can be produced, for example, by mixing the above-mentioned nonaqueous solvents followed by dissolving therein the above-mentioned electrolyte salt and the hydantoin compound represented by the above-mentioned general formula (I) in an amount of from 0.01 to 5% by mass of the resulting nonaqueous electrolytic solution.

In this case, the nonaqueous solvent to be used, and the compound to be added to the nonaqueous electrolytic solution are preferably previously purified at the range not significantly detracting from the producibility, in which, therefore, the impurity content is preferably as low as possible.

The nonaqueous electrolytic solution of the present invention is favorably used for the electrolytic solution for lithium primary batteries and lithium secondary batteries. Further, the nonaqueous electrolytic solution of the present invention is also usable as an electrolytic solution for electric double layer capacitors or as an electrolytic solution for hybrid capacitors. Of those, the nonaqueous electrolytic solution of the present invention is most favorable for lithium secondary batteries.

[Lithium Battery]

The lithium battery of the present invention collectively includes a lithium primary battery and a lithium secondary battery, comprising a positive electrode, a negative electrode and a nonaqueous electrolytic solution of an electrolyte salt dissolved in a nonaqueous solvent, and is characterized in that the nonaqueous electrolytic solution contains a hydantoin compound represented by the above-mentioned general formula (I) in an amount of from 0.01 to 5% by mass of the solution. The content of the hydantoin compound in the nonaqueous electrolytic solution is preferably from 0.5 to 4% by mass, more preferably from 1 to 3% by mass, even more preferably from 1 to 2% by mass.

In the lithium battery of the present invention, the other constitutive components such as the positive electrode and the negative electrode except for the nonaqueous electrolytic solution can be used with no limitation.

For example, as the positive electrode active material for lithium secondary battery, usable are complex metal oxides of lithium containing at least one selected from cobalt, manganese and nickel. One or more such positive electrode active materials may be used either singly or as combined.

The complex metal oxides of lithium include, for example, $LiCoO_2$, $LiMn_2O_4$, $LiNiO_2$, $LiCo_{1-x}Ni_xO_2$ (0.01<x<1), $LiCo_{1/3}Ni_{1/3}Mn_{1/3}O_2$, $LiNi_{1/2}Mn_{3/2}O_4$, $LiCo_{0.98}Mg_{0.02}O_2$, etc. Combinations of $LiCoO_2$ and $LiMn_2O_4$; $LiCoO_2$ and $LiNiO_2$; $LiMn_2O_4$ and $LiNiO_2$ are acceptable herein.

For enhancing the safety in overcharging or enhancing the cycle property, the lithium complex metal oxide may be partly substituted with any other element for enabling the use of the battery at a charging potential of 4.3 V or more. For example, a part of cobalt, manganese and nickel may be substituted with at least one element of Sn, Mg, Fe, Ti, Al, Zr, Cr, V, Ga, Zn, Cu, Bi, Mo, La, etc.; or O may be partly substituted with S or F; or the oxide containing such other element may be coated.

Of those, preferred are lithium complex metal oxides such as $LiCoO_2$, $LiMn_2O_4$ and $LiNiO_2$, with which the positive electrode charging potential in a fully-charged state may be 4.3 V or more, based on Li. More preferred are lithium complex oxides usable at 4.4 V or more, such as $LiCo_{1-x}M_xO_2$ (where M is at least one element of Sn, Mg, Fe, Ti, Al, Zr, Cr, V, Ga, Zn and Cu; 0.001≤x≤0.05), $LiCo_{1/3}Ni_{1/3}Mn_{1/3}O_2$, and $LiNi_{1/2}Mn_{3/2}O_4$. When such a lithium complex metal oxide having a high charging potential is used, then the battery characteristics such as high-temperature storage property and cycle property may worsen owing to the reaction of the oxide with the nonaqueous electrolytic solution in charging; however, the battery characteristics of the lithium secondary battery of the present invention are prevented from worsening.

Further, lithium-containing olivine-type phosphates are also usable as the positive electrode active material. Especially preferred are lithium-containing olivine-type phosphates containing at least one selected from Fe, Co, Ni and Mn. Their concrete examples include $LiFePO_4$, $LiCoPO_4$, $LiNiPO_4$, $LiMnPO_4$, etc.

The lithium-containing olivine-type phosphates may be partly substituted with any other element. For example, apart of iron, cobalt, nickel and manganese therein may be substituted with at least one element selected from Co, Mn, Ni, Mg, Al, B, Ti, V, Nb, Cu, Zn, Mo, Ca, Sr, W and Zr; or the phosphates may be coated with a compound containing any of these other elements or with a carbon material. Of those, preferred are $LiFePO_4$ and $LiMnPO_4$.

The lithium-containing olivine-type phosphate may be combined with, for example, the above-mentioned positive electrode active materials.

Not specifically defined, the electroconductive agent of the positive electrode may be any electron-conductive material not undergoing chemical change. For example, it includes graphites such as natural graphite (flaky graphite, etc.), artificial graphite, etc.; carbon blacks such as acetylene black, Ketjen black, channel black, furnace black, lamp black, thermal black, etc. Graphites and carbon blacks may be combined suitably. The amount of the electroconductive agent to be added to the positive electrode mixture is preferably from 1 to 10% by mass, more preferably from 2 to 5% by mass.

The positive electrode may be formed by mixing the above-mentioned positive electrode active material with an electroconductive agent such as acetylene black, carbon black or the like, and with a binder such as polytetrafluoroethylene (PTFE), polyvinylidene fluoride (PVDF), styrene/butadiene copolymer (SBR), acrylonitrile/butadiene copolymer (NBR), carboxymethyl cellulose (CMC), ethylene/propylene/diene terpolymer or the like, then adding thereto a high-boiling-point solvent such as 1-methyl-2-pyrrolidone or the like, and kneading them to give a positive electrode mixture, thereafter applying the positive electrode mixture onto an aluminium foil or a stainless lath plate or the like serving as a collector, and drying and shaping it under pressure, and then heat-treating it in vacuum at a temperature of from 50° C. to 250° C. or so for about 2 hours.

The density of the part except the collector of the positive electrode may be generally at least 1.5 g/cm$^3$, and for further increasing the capacity of the battery, the density is preferably at least 2 g/cm$^3$, more preferably at least 3 g/cm$^3$, even more preferably at least 3.6 g/cm$^3$. When more than 4.0 g/cm$^3$, however, the formation may be substantially difficult, and therefore, the upper limit is preferably at most 4.0 g/cm$^3$.

For the positive electrode for lithium primary battery, there are mentioned oxides or chalcogen compounds of one or more metal elements such as CuO, $Cu_2O$, $Ag_2O$, $Ag_2CrO_4$, CuS, $CuSO_4$, $TiO_2$, $TiS_2$, $SiO_2$, SnO, $V_2O_5$, $V_6O_{12}$, $VO_x$, $Nb_2O_5$, $Bi_2O_3$, $Bi_2Pb_2O_5$, $Sb_2O_3$, $CrO_3$, $Cr_2O_3$, $MoO_3$, $WO_3$, $SeO_2$, $MnO_2$, $Mn_2O_3$, $Fe_2O_3$, FeO, $Fe_3O_4$, $Ni_2O_3$, NiO, $CoO_3$, CoO, etc.; sulfur compounds such as $SO_2$, $SOCl_2$, etc.; carbon fluorides (fluorographite) represented by a general formula $(CF_x)_n$, etc. Of those, preferred are $MnO_2$, $V_2O_5$, fluorographite, etc.

As the negative electrode active material for lithium secondary battery, usable are one or more of lithium metal, lithium alloys, carbon materials (graphites such as artificial graphite, natural graphite, etc.) capable of absorbing and releasing lithium, metal compounds capable of absorbing and releasing lithium and the like, either singly or as combined.

Of those, preferred is use of high-crystalline carbon materials such as artificial graphite, natural graphite and the like, in view of the ability thereof to absorb and release lithium ions, and more preferred is use of a carbon material having a graphite-type crystal structure where the lattice (002) spacing ($d_{002}$) is at most 0.340 nm (nanometers), especially from 0.335 to 0.337 nm. Use of such a high-crystalline carbon material may worsen battery characteristics such as high-temperature storage property and cycle property since the material may readily react with a nonaqueous electrolytic solution in charging; however, in the lithium secondary battery of the present invention, the reaction of the material with the nonaqueous electrolytic reaction can be retarded. Preferably, the high-crystalline carbon material for use herein is coated with a low-crystalline carbon material since the decomposition of the nonaqueous electrolytic solution can be retarded more effectively.

The metal compound capable of absorbing and releasing lithium, serving as a negative electrode active material, includes compounds containing at least one metal element of Si, Ge, Sn, Pb, P, Sb, Bi, Al, Ga, In, Ti, Mn, Fe, Co, Ni, Cu, Zn, Ag, Mg, Sr, Ba, etc. These metal compounds may have any morphology of simple substances, alloys, oxides, nitrides, sulfides, borides, alloys with lithium or the like; but preferred are any of simple substances, alloys, oxides and alloys with lithium, as capable of increasing the battery capacity. Above all, more preferred are those containing at least one element selected from Si, Ge and Sn, and even more preferred are those containing at least one element selected from Si and Sn, as capable of increasing the capacity of the battery.

The negative electrode may be formed, using the same electroconductive agent, binder and high-boiling point solvent as in the formation of the above-mentioned positive electrode. These are mixed and kneaded to give a negative electrode mixture, then the negative electrode mixture is applied onto a copper foil or the like serving as a collector, then dried and shaped under pressure, and thereafter heat-treated in vacuum at a temperature of from 50° C. to 250° C. or so for about 2 hours.

In case where graphite is used as the negative electrode active material, the density of the part except the collector of the negative electrode may be generally at least 1.4 g/cm$^3$, and for further increasing the capacity of the battery, the density is preferably at least 1.6 g/cm$^3$, more preferably at least 1.7 g/cm$^3$. When more than 2.0 g/cm$^3$, however, the formation may be substantially difficult, and therefore, the upper limit is preferably at most 2.0 g/cm$^3$.

As the negative electrode active material for lithium primary battery, usable is a lithium metal or a lithium alloy.

The structure of the lithium secondary battery is not specifically defined. The battery may be a coin-shaped battery, a cylindrical battery, a square-shaped battery, or a laminate-type battery, each having a single-layered or multi-layered separator.

The separator for battery is not specifically defined, for which usable is a single-layer or laminate porous film of polyolefin such as polypropylene, polyethylene or the like, as well as a woven fabric, a nonwoven fabric, etc.

The lithium secondary battery of the present invention exhibits excellent long-term cycle property even when the final charging voltage is 4.2 V or higher and particularly 4.3 V or higher. Furthermore, the cycle property is still good even when the final charging voltage is 4.4 V, and the high-temperature storage property of the battery is also improved. The final discharging voltage may be generally at least 2.8 V and further at least 2.5 V; however, the final discharging voltage of the lithium secondary battery of the present invention can be at least 2.0 V. The current value is not specifically defined. In general, the current mode is a constant current discharging mode at the range from 0.1 to 3 C. The lithium secondary battery of the present invention may be charged and discharged at −40° C. to 100° C. and preferably at 0° C. to 80° C.

In the present invention, as a countermeasure against the increase in the internal pressure of the lithium secondary battery, there may be employed a method of providing a safety valve in the battery cap or a method of forming a cutout in the battery component such as the battery can, the gasket or the like. In addition, as a safety countermeasure against over-charging, a current breaker capable of detecting the internal pressure of the battery to cut off the current may be provided in the battery cap.

EXAMPLES

Examples of using the nonaqueous electrolytic solution of the invention are shown below; however, the invention is not limited to these Examples.

Examples 1 to 10, and Comparative Examples 1 to 4

[Production of Lithium Ion Secondary Battery]

94% by mass of LiCoO$_2$ (positive electrode active material) and 3% by mass of acetylene black (electroconductive agent) were mixed, and added to and mixed with a solution previously prepared by dissolving 3% by mass of polyvinylidene fluoride (binder) in 1-methyl-2-pyrrolidone, thereby preparing a positive electrode mixture paste. The positive electrode mixture paste was applied onto one surface of an aluminium foil (collector), dried, processed under pressure and cut into a predetermined size, thereby producing a positive electrode sheet. The density of the part of the positive electrode except the collector was 3.6 g/cm$^3$.

On the other hand, 95% by mass of artificial graphite ($d_{002}$=0.335 nm, negative electrode active material) coated with low-crystalline carbon was added to and mixed with a solution previously prepared by dissolving 5% by mass of polyvinylidene fluoride (binder) in 1-methyl-2-pyrrolidone, thereby preparing a negative electrode mixture paste. The negative electrode mixture paste was applied onto one surface of a copper foil (collector), dried, processed under pressure and cut into a predetermined size, thereby producing a negative electrode sheet. The density of the part of the negative electrode except the collector was 1.7 g/cm$^3$.

The positive electrode sheet and the negative electrode sheet produced in the above were used. The positive electrode sheet, a porous polyethylene film separator and the negative electrode sheet were laminated in that order. A predetermined amount of the hydantoin compound shown in Table 1 was added to the nonaqueous electrolytic solution having the composition shown in Table 1. The thus-prepared nonaqueous electrolytic solution was added to the above electrode laminate, thereby fabricating 2032-type coin batteries of Examples 1 to 10 and Comparative Examples 1 to 4

The obtained batteries were evaluated for the cycle property and the high-temperature storage property, according to the methods mentioned below. The results are shown in Table 1.

[Evaluation of Cycle Property]

In a thermostat chamber kept at 60° C., the coin battery fabricated according to the above-mentioned method was charged up to a final voltage of 4.3 V for 3 hours with a constant current of 1 C and under a constant voltage, and then discharged under a constant current of 1 C to a final voltage of 3.0 V. This is one cycle. The coin battery was repeatedly charged/discharged for a total of 100 cycles. According to the following formula, the discharge capacity retention rate (%) of the battery after 100 cycles was determined.

Discharge Capacity Retention Rate (%)=(discharge capacity on 100 cycles/discharge capacity in first cycle)×100.

[Evaluation of High-Temperature Storage Property]

Another coin battery using the same nonaqueous electrolytic solution as in the above was tested. In a thermostat chamber kept at 25° C., the battery was charged up to a final voltage of 4.3 V for 3 hours with a constant current of 1 C and under a constant voltage, and then discharged under a constant current of 1 C to a final voltage of 3.0 V. The mean discharge voltage during the discharging is "mean discharge voltage before storage".

Again the battery was charged up to a final voltage of 4.3 V for 3 hours with a constant current of 1 C and under a constant voltage, then put in a thermostat chamber at 60° C., and left therein for 3 days while kept at 4.3 V. Subsequently, the battery was put in a thermostat chamber at 25° C., once discharged to a final voltage of 3.0 V under a constant current of 1 C, then again charged up to a final voltage of 4.3 V for 3 hours with a constant current of 1 C and under a constant voltage, and thereafter discharged to a final voltage of 3.0 V under a constant current of 1 C. The mean discharge voltage during the discharging is "mean discharge voltage after storage".

Coin batteries were fabricated in the same manner as in Example 1 except that a hydantoin compound was not added to the nonaqueous electrolytic solution. According to the formula mentioned below, "mean discharge voltage reduction rate (s)" after storage at high temperature was calculated, based on Comparative Example 1, Mean Discharge Voltage Reduction Rate (relative value) (%)=(mean discharge voltage before storage−mean discharge voltage after storage)/(mean discharge voltage before storage in Comparative Example 1−mean discharge voltage after storage in Comparative Example 1)×100.

TABLE 1

| | Composition of Electrolyte Salt Composition of Nonaqueous Electrolytic Solution (ratio by volume of solvent) | Added Compound | Added Amount (content in nonaqueous electrolytic solution) (mass %) | Discharge Capacity Retention Rate after 100 cycles (%) | Mean Discharge Voltege Reduction Rate after storage at high temperature (relative value) (%) |
|---|---|---|---|---|---|
| Example 1 | 1M LiPF6 EC/VC/MEC/DEC (28/2/40/30) | 1,3-dimethyl-hydantoin | 0.05 | 81 | 75 |
| Example 2 | 1M LiPF6 EC/VC/MEC/DEC (28/2/40/30) | 1,3-dimethyl-hydantoin | 1 | 64 | 68 |
| Example 3 | 1M LiPF6 EC/VC/MEC/DEC (28/2/40/30) | 1,3-dimethyl-hydantoin | 3 | 83 | 69 |
| Example 4 | 1M LiPF6 EC/VC/MEC/DEC (28/2/40/30) | 1,3,5,5-tetramethyl-hydantoin | 1 | 86 | 66 |
| Example 5 | 1M LiPF6 EC/VC/MEC/DEC (28/2/40/30) + adiponitrile; 1 wt % | 1,3,5,5-tetramethyl-hydantoin | 1 | 90 | 63 |
| Example 6 | 0.95M LiPF6 + 0.05M LiN(SO2CF3)2 EC/VC/VEC/MEC/DEC (17/2/1/50/30) | 1,3-dimethyl-hydantoin | 1 | 87 | 66 |
| Example 7 | 0.95M LiPF6 + 0.05M Li8F4 FEC/EC/VC/DMC/MEC (23/5/2/20/50) | 1,3-dimelhyl-hydantoin | 1 | 88 | 65 |
| Example 8 | 1M LiPF6 EC/VC/MEC/DEC (28/2/40/30) + 1,3-di-tert-butylbenzene; 3 wt % | 1,3-dimethyl-hydantoin | 1 | 86 | 67 |
| Example 9 | 1M LiPF6 EC/VC/MEC/DEC (28/2/40/30) + 1,3-di-tert-butylbenzene; 3 wt % + 7,8,15,16-tetraoxadispiro[5.2.5.2]hexadecane; 0.1 wt % | 1,3-dimethyl-hydantoin | 1 | 90 | 62 |
| Example 10 | 1M LiPF6 EC/VC/MEC/DEC (28/2/40/30) + 1,3-di-tert-butylbenzene; 3 wt % + 14,15-dioxa-7-azadispiro[5.1.5.2]pentadecane; 0.1 wt % | 1,3-dimethyl-hydantoin | 1 | 89 | 64 |
| Comparative Example 1 | 1M LiPF6 EC/VC/MEC/DEC (28/2/40/30) | none | — | 77 | 100 |

TABLE 1-continued

|  | Composition of Electrolyte Salt Composition of Nonaqueous Electrolytic Solution (ratio by volume of solvent) | Added Compound | Added Amount (content in nonaqueous electrolytic solution) (mass %) | Discharge Capacity Retention Rate after 100 cycles (%) | Mean Discharge Voltege Reduction Rate after storage at high temperature (relative value) (%) |
|---|---|---|---|---|---|
| Comparative Example 2 | 1M LiPF6 EC/VC/MEC/DEC (28/2/40/30) | 1-melhyl-2-pyrrolidone | 1 | 78 | 115 |
| Comparative Example 3 | 1M LiPF6 EC/VC/MEC/DEC (28/2/40/30) | N-methyl-succinimide | 1 | 79 | 110 |
| Comparative Example 4 | 1M LiPF6 EC/VC/MEC/DEC (28/2/40/30) | 1,3-dimethyl-2-imidazolidinone | 1 | 77 | 108 |

The details of the components of the electrolytic solution in Table 1 are as follows:

(Cyclic Carbonate)
EC: ethylene carbonate
VC: vinylene carbonate
VEC: vinylethylene carbonate
FEC: 4-fluoro-1,3-dioxolan-2-one
(Linear Carbonate)
MEC: methyl ethyl carbonate
DEC: diethyl carbonate
DMC: dimethyl carbonate Examples 11 to 13, and Comparative Example 5

2032-type coin batteries of Examples 11 to 13 and Comparative Example 5 were fabricated in the same manner as in Example 1, in which, however, the nonaqueous electrolytic solution used was prepared by adding a predetermined amount of a hydantoin compound to the nonaqueous electrolytic solution having the composition shown in Table 2.

The mean discharge voltage reduction rate after storage at high temperature was calculated, based on Comparative Example 5.

Example 14 and Comparative Example 6

A positive electrode sheet was produced, using $LiFePO_4$ (positive electrode active material) in place of the positive electrode active material used in Example 2 and Comparative Example 1. 90% by mass of $LiFePO_4$ and 5% by mass of acetylene black (electroconductive agent) were mixed, and added to and mixed in a solution previously prepared by dissolving 5% by mass of polyvinylidene fluoride (binder) in 1-methyl-2-pyrrolidone, thereby preparing a positive electrode mixture paste. A coin battery was fabricated in the same manner as in Example 2 and Comparative Example 1, for which, however, the above positive electrode mixture paste was applied onto an aluminium foil (collector), dried, processed under pressure and cut into a predetermined size, thereby preparing a positive electrode sheet, and in the cycle property evaluation and the storage property evaluation, the final charging voltage was 3.8 V and the final discharging voltage was 2.0 V; and the battery was evaluated. The results are shown in Table 3.

The mean discharge voltage reduction rate after storage at high temperature was calculated, based on Comparative Example 6.

TABLE 2

|  | Composition of Electrolyte Salt Composition of Nonaqueous Electrolytic Solution (ratio by volume of solvent) | Added Compound | Added Amount (content in nonaqueous electrolytic solution) (mass %) | Discharge Capacity Retention Rate after 100 cycles (%) | Mean Discharge Voltage Reduction Rate after storage at high temperature (relative value) (%) |
|---|---|---|---|---|---|
| Example 11 | 1M LiPF6 EC/MEC (30/70) | 1,3,5,5-tetramethyl-hydantoin | 0.05 | 82 | 70 |
| Example 12 | 1M LiPF6 EC/MEC (30/70) | 1,3,5,5-tetramethyl-hydantoin | 1 | 85 | 64 |
| Example 13 | 1M LiPF6 EC/MEC (30/70) | 1,3,5,5-tetramethyl-hydantoin | 3 | 84 | 66 |
| Comparative Example 5 | 1M LiPF6 EC/MEC (30/70) | none | — | 72 | 100 |

TABLE 3

| | Composition of Electrolyte Salt Composition of Nonaqueous Electrolytic Solution (ratio by volume of solvent) | Added Compound | Added Amount (content in nonaqueous electrolytic solution) (mass %) | Discharge Capacity Retention Rate after 100 cycles (%) | Mean Discharge Voltage Reduction Rate after storage at high temperature (relative value) (%) |
|---|---|---|---|---|---|
| Example 14 | 1M LiPF6 EC/VC/MEC/DEC (28/2/40/30) | 1,3-dimethyl-hydantoin | 1 | 87 | 62 |
| Comparative Example 6 | 1M LiPF6 EC/VC/MEC/DEC (28/2/40/30) | none | 1 | 73 | 100 |

Example 15 and Comparative Example 7

A negative electrode sheet was produced, using Si (negative electrode active material) in place of the negative electrode active material, artificial graphite coated with low-crystalline carbon used in Example 2 and Comparative Example 1. 75% by mass of Si, 10% by mass of artificial graphite (electroconductive agent), 10% by mass of acetylene black (electroconductive agent) and 5% by mass of polyvinylidene fluoride (binder) were mixed, and 1-methyl-2-pyrrolidone solvent was added thereto; and the resulting mixture was applied to a copper foil collector, dried, processed under pressure and cut into a predetermined size, thereby producing a negative electrode sheet. A coin battery was fabricated in the same manner as in Example 2 and Comparative Example 1, using the nonaqueous electrolytic solution produced in the same manner as therein but using the negative electrode sheet produced here; and the battery was evaluated for the battery characteristics thereof. The results are shown in Table 4.

The mean discharge voltage reduction rate after storage at high temperature was calculated, based on Comparative Example 7.

parative Example 7, the same effect is also seen in the case where a lithium-containing olivine-type iron phosphate is used for the positive electrode and in the case where Si is used for the negative electrode. Accordingly, it is known that the effect of the present invention does not depend on a specific positive electrode or negative electrode.

Further, the nonaqueous electrolytic solution of the present invention is further effective for improving the high-temperature storage property of lithium primary battery.

INDUSTRIAL APPLICABILITY

The lithium battery using the nonaqueous electrolytic solution of the invention is excellent in battery characteristics such as high-temperature storage property and cycle property, and is therefore extremely useful.

The invention claimed is:
1. A nonaqueous electrolytic solution comprising an electrolyte salt dissolved in a nonaqueous solvent, comprising a hydantoin compound of formula (I) in an amount of from 0.01 to 5% by mass of the nonaqueous electrolytic solution:

TABLE 4

| | Composition of Electrolyte Salt Composition of Nonaqueous Electrolytic Solution (ratio by volume of solvent) | Added Compound | Added Amount (content in nonaqueous electrolytic solution) (mass %) | Discharge Capacity Retention Rate after 100 cycles (%) | Mean Discharge Voltage Reduction Rate after storage at high temperature (relative value) (%) |
|---|---|---|---|---|---|
| Example 15 | 1M LiPF6 EC/VC/MEC/DEC (28/2/40/30) | 1,3-dimethyl-hydantoin | 1 | 71 | 61 |
| Comparative Example 7 | 1M LiPF6 EC/VC/MEC/DEC (28/2/40/30) | none | 1 | 31 | 100 |

The lithium secondary batteries of Examples 1 to 10 of the present invention to which was added a hydantoin compound having two continuous units of (—CO—NR—) (amide structure) was added significantly improved in point of the battery characteristics such as the high-temperature storage property and the cycle property thereof, as compared with the lithium secondary barriers of Comparative Example 1 (the compound not added), Comparative Example 2 (1-methyl-2-pyrrolidone added), Comparative Example 3 (N-methyl-succinimide added) and Comparative Example 4 (1,3-dimethyl-2-imidazolidinone added).

Comparison between Examples 11 to 13 and Comparative Example 5 indicates that the addition of the hydantoin compound improves high-temperature storage property.

From comparison between Example 14 and Comparative Example 6 and comparison between Example 15 and Com-

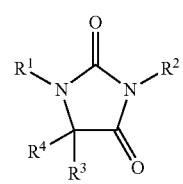

wherein
$R^1$ and $R^2$ are each independently a methyl group or an ethyl group; and
$R^3$ and $R^4$ are each independently a hydrogen atom, a methyl group or an ethyl group.

2. The nonaqueous electrolytic solution according to claim 1, wherein at least one of $R^3$ and $R^4$ in formula (I) is a methyl group or an ethyl group.

3. The nonaqueous electrolytic solution according to claim 1, wherein the electrolyte salt is at least one selected from the group consisting of $LiPF_6$, $LiBF_4$, $LiN(SO_2CF_3)_2$ and $LiN(SO_2C_2F_5)_2$.

4. The nonaqueous electrolytic solution according to claim 3, wherein the electrolyte salt comprises $LiPF_6$ in a molar ratio ($LiPF_6$/electrolyte salt selected from $LiBF_4$, $LiN(SO_2CF_3)_2$ and $LiN(SO_2C_2F_5)_2$) of from 70/30 to 99/1.

5. The nonaqueous electrolytic solution according to claim 1, wherein the nonaqueous solvent comprises a cyclic carbonate and a linear carbonate.

6. The nonaqueous electrolytic solution according to claim 5, wherein a ratio by volume of cyclic carbonate/linear carbonate is from 10/90 to 40/60.

7. The nonaqueous electrolytic solution according to claim 6, wherein the cyclic carbonate comprises at least one selected from the group consisting of ethylene carbonate, propylene carbonate and a double bond-comprising or fluroine-comprising cyclic carbonate.

8. The nonaqueous electrolytic solution according to claim 7, wherein the double bond-comprising cyclic carbonate is vinylene carbonate or vinylethylene carbonate, and the fluroine-comprising cyclic carbonate is 4-fluoro-1,3-dioxolan-2-one or 4,5-difluoro-1,3-dioxolan-2-one.

9. The nonaqueous electrolytic solution according to claim 5, wherein the linear carbonate comprises an asymmetric linear carbonate.

10. The nonaqueous electrolytic solution according to claim 9, wherein the asymmetric carbonate comprises a methyl group.

11. A lithium battery comprising a positive electrode, a negative electrode, and the nonaqueous electrolytic solution according to claim 1.

12. The lithium battery according to claim 11, wherein the positive electrode comprises a positive electrode active material comprising at least one compound selected from the group consisting of lithium complex alloy oxides and lithium-comprising olivine-type phosphates.

13. The lithium battery according to claim 11, wherein the negative electrode comprises a negative electrode active material comprising at least one selected from the group consisting of lithium metal, lithium alloys, carbon materials capable of absorbing and releasing lithium, and metal compounds capable of absorbing and releasing lithium.

* * * * *